(12) United States Patent
Zeik et al.

(10) Patent No.: US 10,518,961 B2
(45) Date of Patent: Dec. 31, 2019

(54) AEROSOL DISPENSER WITH IMPROVED NECK GEOMETRY OUTER CONTAINER THEREFOR AND PREFORM THEREFOR

(71) Applicant: The Procter & Gamble Company, Cincinnati, OH (US)

(72) Inventors: Douglas Bruce Zeik, Liberty Township, OH (US); Scott Edward Smith, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 15/804,038

(22) Filed: Nov. 6, 2017

(65) Prior Publication Data

US 2019/0135529 A1    May 9, 2019

(51) Int. Cl.
| | |
|---|---|
| *B65D 83/38* | (2006.01) |
| *B65D 83/32* | (2006.01) |
| *B65D 83/62* | (2006.01) |
| *B65D 83/20* | (2006.01) |

(52) U.S. Cl.
CPC .............. *B65D 83/38* (2013.01); *B65D 83/32* (2013.01); *B65D 83/62* (2013.01); *B65D 83/20* (2013.01)

(58) Field of Classification Search
CPC ........ B65D 83/14; B65D 83/38; B65D 83/02; B65D 83/003; B65D 83/70; B65D 83/225; B65D 83/384
See application file for complete search history.

(56) References Cited

U.S. PATENT DOCUMENTS

| | | | |
|---|---|---|---|
| 2,863,699 A | 12/1958 | Elser | |
| 2,948,439 A * | 8/1960 | Glover | ............... B65D 23/0814 |
| | | | 222/183 |
| 3,074,602 A * | 1/1963 | Charlton | ............... B65D 83/70 |
| | | | 222/397 |
| 3,292,826 A | 12/1966 | Abplanalp | |

(Continued)

FOREIGN PATENT DOCUMENTS

| | | |
|---|---|---|
| DE | 9208050 U1 | 10/1993 |
| EP | 2551215 A1 | 1/2013 |

(Continued)

OTHER PUBLICATIONS

U.S. Appl. No. 15/804,031, filed Nov. 6, 2017, Andrew William Franckhauser, et al.

(Continued)

*Primary Examiner* — Paul R Durand
*Assistant Examiner* — Randall A Gruby
(74) *Attorney, Agent, or Firm* — Sarah M DeCristofaro (57) ABSTRACT

An aerosol dispenser, an outer container for an aerosol dispenser and a preform for an outer container. The aerosol dispenser, outer container and preform each have a neck, which in turn has a crimp ring, to receive a valve cup clinched thereto and a lower neck potion upon which the crimp ring is mounted. The lower neck portion extends between the bottom of the crimp ring and a shoulder which transitions into the sidewalls. The crimp ring preferably has a greater axial length than the lower neck portion. This geometry allows flexibility in the thickness throughout the thickness of the entire neck. The geometry advantageously minimizes distortion of the neck in the event of overpressurization.

5 Claims, 6 Drawing Sheets

(56) References Cited

U.S. PATENT DOCUMENTS

| | | | |
|---|---|---|---|
| 3,333,743 A | 8/1967 | Meyers | |
| 3,372,827 A | 3/1968 | Altschuler | |
| 3,403,804 A | 10/1968 | Colombo | |
| 3,404,863 A | 10/1968 | Green | |
| 3,450,254 A | 6/1969 | Miles | |
| 3,724,727 A | 4/1973 | Zundel | |
| 3,815,534 A | 6/1974 | Kneusel | |
| 3,912,130 A | 10/1975 | Pelton | |
| 3,918,610 A * | 11/1975 | Willis | B65D 83/70 222/397 |
| 3,918,611 A * | 11/1975 | Ewald | B65D 83/20 222/396 |
| RE30,093 E | 9/1979 | Burger | |
| 4,323,203 A | 4/1982 | Neufeld | |
| 4,330,066 A | 5/1982 | Berliner | |
| 4,721,224 A * | 1/1988 | Kawabata | B65D 83/70 220/89.2 |
| 4,969,577 A | 11/1990 | Werding | |
| 5,121,858 A * | 6/1992 | Chong | B65D 83/70 137/467 |
| 5,152,411 A * | 10/1992 | Pope | B65D 23/00 215/381 |
| 5,199,615 A | 4/1993 | Downing | |
| 5,219,005 A * | 6/1993 | Stoffel | B65D 83/62 141/20 |
| 5,249,701 A * | 10/1993 | Daehn | B65D 83/38 220/612 |
| 5,460,300 A | 10/1995 | Tritsch | |
| 6,019,252 A | 2/2000 | Benecke et al. | |
| 6,039,222 A | 3/2000 | Smith | |
| 6,253,970 B1 | 7/2001 | Kohn | |
| 6,254,820 B1 | 7/2001 | Cornell | |
| 6,375,045 B1 | 2/2002 | Ki | |
| 7,028,866 B2 | 4/2006 | Kunesh et al. | |
| 7,226,579 B1 * | 6/2007 | Mekata | A01N 25/06 424/405 |
| 7,279,207 B2 | 10/2007 | Darr | |
| 7,303,087 B2 * | 12/2007 | Flashinski | B65D 83/38 215/311 |
| 7,971,759 B2 | 7/2011 | Dalan et al. | |
| 8,074,847 B2 | 12/2011 | Smith | |
| 8,096,327 B2 | 1/2012 | Hirz | |
| 8,119,211 B1 * | 2/2012 | Taylor | B32B 27/08 428/34.1 |
| 8,439,223 B2 | 5/2013 | Smith et al. | |
| 8,505,762 B2 | 8/2013 | Holbach et al. | |
| 8,511,522 B2 | 8/2013 | Chan et al. | |
| 8,631,632 B2 | 1/2014 | Morales et al. | |
| 8,752,731 B2 | 6/2014 | Nimmo et al. | |
| 8,844,765 B2 | 9/2014 | Tryon | |
| 8,869,842 B2 * | 10/2014 | Smith | B65B 31/025 141/3 |
| 9,061,795 B2 | 6/2015 | Girardot et al. | |
| 9,132,955 B2 | 9/2015 | Smith et al. | |
| 9,174,229 B2 | 11/2015 | Smith | |
| 9,199,783 B2 * | 12/2015 | Wanbaugh | B05B 11/3047 |
| 9,296,550 B2 | 3/2016 | Smith et al. | |
| 9,334,103 B2 | 5/2016 | Soliman | |
| 9,394,098 B2 | 7/2016 | Kohls et al. | |
| 9,505,509 B2 | 11/2016 | Smith | |
| 9,845,186 B2 * | 12/2017 | Patel | B65D 83/38 |
| 10,071,850 B2 * | 9/2018 | Sugawara | B65D 83/38 |
| 2002/0027146 A1 | 3/2002 | De Laforcade et al. | |
| 2003/0215400 A1 * | 11/2003 | Schroeder | A61K 8/33 424/47 |
| 2005/0127022 A1 * | 6/2005 | Flashinski | B65D 83/38 215/40 |
| 2008/0164256 A1 * | 7/2008 | Youm | B65D 83/70 220/203.08 |
| 2009/0014679 A1 | 1/2009 | Hygema et al. | |
| 2011/0248035 A1 | 10/2011 | Piersman et al. | |
| 2012/0241457 A1 | 9/2012 | Hallman et al. | |
| 2012/0291911 A1 | 11/2012 | Smith | |
| 2014/0209063 A1 | 7/2014 | Feng | |
| 2014/0209633 A1 * | 7/2014 | McDaniel | B29B 11/14 222/95 |
| 2015/0001256 A1 | 1/2015 | Kohls | |
| 2015/0329273 A1 * | 11/2015 | Salameh | B65D 83/38 222/402.1 |
| 2016/0368633 A1 | 12/2016 | Smith et al. | |
| 2016/0368700 A1 | 12/2016 | Smith et al. | |
| 2017/0183137 A1 | 6/2017 | Walton et al. | |
| 2017/0341849 A1 * | 11/2017 | Wolak | B65D 1/023 |
| 2018/0102481 A1 | 4/2018 | King | |
| 2018/0155115 A1 | 6/2018 | Wolak et al. | |
| 2019/0135530 A1 | 5/2019 | Franckhauser | |
| 2019/0135532 A1 | 5/2019 | Franckhauser | |
| 2019/0169878 A1 * | 6/2019 | Perrenoud | E05B 67/063 |
| 2019/0202625 A1 | 7/2019 | Franckhauser et al. | |
| 2019/0225355 A1 * | 7/2019 | Siegl | B65D 83/75 |

FOREIGN PATENT DOCUMENTS

| | | |
|---|---|---|
| JP | H07300168 A | 11/1995 |
| JP | 2004099180 A | 4/2004 |
| JP | 2005162231 A | 4/2006 |
| JP | 2006176131 A | 7/2006 |
| JP | 2013249073 A | 12/2013 |
| JP | 2013249074 A | 12/2013 |
| WO | WO9006889 A1 | 6/1990 |
| WO | WO 91/08099 A1 | 6/1991 |

OTHER PUBLICATIONS

International Search Report and Written opinion dated Feb. 11, 2019, U.S. Appl. No. 15/804,031, 15 pgs.

Partial International Search Report and Written opinion dated Feb. 19, 2019, U.S. Appl. No. 15/804,038, 12 pgs.

European Search Report dated Apr. 24, 2019, 13 pgs.

All Office Actions, U.S. Appl. No. 15/804,031.

All Office Actions, U.S. Appl. No. 15/860,692.

* cited by examiner

AEROSOL DISPENSER WITH IMPROVED NECK GEOMETRY OUTER CONTAINER THEREFOR AND PREFORM THEREFOR

FIELD OF THE INVENTION

The present invention relates to aerosol dispensers having an advantageous neck geometry, the outer container for such aerosol dispenser and the preform to make such an outer container.

BACKGROUND OF THE INVENTION

Aerosol dispensers are well known in the art. Aerosol dispensers typically comprise an outer container which acts as a frame for the remaining components and as a pressure vessel for propellant and product contained therein. Outer containers made of metal are well known in the art. However, metal containers can be undesirable due to high cost and limited recyclability. Attempts to use plastic have occurred in the art. Relevant attempts in the art to employ plastic in aerosol dispensers are found in U.S. Pat. Nos. 2,863,699; 3,333,743; 9,296,550; 9,334,103 and 2009/0014679.

The outer containers are typically, but not necessarily, cylindrical. The outer container may comprise a closed end bottom adjoining the sidewalls and for resting on horizontal surfaces such as shelves, countertops, tables etc. The bottom of the outer container may comprise a re-entrant portion as shown in U.S. Pat. No. 3,403,804 or base cup as shown in U.S. Pat. No. 9,061,795. Sidewalls defining the shape of the outer container extend upwardly from the bottom to an open top.

The open top defines a neck for receiving additional components of the aerosol dispenser. The industry has generally settled upon a nominal neck diameter of 2.54 cm, for standardization of components among various manufacturers, although smaller diameters, such as 20 mm, are also used. Various neck shapes are shown in U.S. Pat. Nos. 6,019,252; 7,028,866; 7,279,207 and 7,303,087.

The neck may have a crimp ring at the top and a support flange somewhere near the vertical mid-area of the neck. The crimp ring accepts a metal valve up, as discussed below. The support flange is used for transport and as an anvil during manufacture.

Typically a valve cup is inserted into the neck. The valve cup is sealed against the neck to prevent the escape of the propellant and loss of pressurization, such as described in U.S. Pat. Nos. 8,074,847; 8,096,327; 8,844,765 and 8,869,842. The valve cup holds the valve components which are movable in relationship to the balance of the aerosol dispenser. Suitable valves are shown in commonly assigned U.S. Pat. Nos. 8,511,522 and 9,132,955. When the valves are opened, product may be dispensed through a nozzle, etc. as described in commonly assigned U.S. Pat. No. 9,174,229.

A valve may be inserted into the valve cup for selective actuation by the user. The valve is typically normally closed, but may be opened to create a flow path for the product to ambient or a target surface. The valve may be compatible with local recycling standards. Suitable valves are disclosed in commonly assigned U.S. Pat. Nos. 8,511,522 and 9,132,955.

If a valve is to be assembled into an aerosol, typically the valve cup is crimped onto the neck of the aerosol container. But this operation is expensive and is difficult to perform with a plastic valve cup. A separate interlock may be used to attach a valve to a valve cup, particularly a plastic valve and plastic valve cup are used. Suitable interlocks include bayonet fittings and threads as disclosed in commonly assigned P&G application, Case 14458, Ser. No. 15/235,237, filed Aug. 12, 2016. A pressure vessel with a threaded bore is proposed in U.S. Pat. No. 8,505,762.

A bag may be used to contain product for selective dispensing by a user. Dispensing of product from the bag occurs in response to the user actuating the valve. The bag separates product within the bag from propellant disposed between the bag and container. This bag limits or even prevents intermixing of the contents of the bag and the components outside of the bag. Thus, product may be contained in the bag. Propellant may be disposed between the outside of the bag and the inside of the outer container. Upon actuation of the valve, a flow path out of the bag is created. This embodiment is commonly called a bag in can and may be used, for example, in dispensing shaving cream gels. Alternatively, a bag may be directly joined to the valve housing, in a configuration commonly called a bag on valve. A suitable bag configuration is disclosed in commonly assigned application, P&G Case 14458, Ser. No. 15/235,227, filed Aug. 12, 2016 which teaches attaching a bag to a valve cup.

If a bag configuration is desired, propellant may be disposed between the bag and outer container, as disclosed in commonly assigned U.S. Pat. Nos. 8,631,632 and 8,869,842. Afterwards, product fill may occur in a separate, remote, operation, optionally carried out in another location, which may be in the same country or in a different country. Such a manufacturing process can conserve costs in production, shipment and/or storage.

An aerosol container having a bag therein may be made from a dual layer preform, having plural layers disposed one inside the other. Relevant attempts include U.S. Pat. Nos. 3,450,254; 4,330,066; 6,254,820; RE 30093 E; and publications WO 9108099 and US 2011/0248035 A1. But each of these attempts requires a separate operation to attach the bag to the relevant component. Each attachment step takes time in manufacturing and creates the opportunity for leakage if not correctly performed. Improvements in dual layer preforms are found in commonly assigned application P&G Case 14461, application Ser. No. 15/235,279, filed Aug. 12, 2016.

Alternatively, a dip tub may be used if intermixing of the product and propellant is desired. When the user actuates the valve, the product and propellant are dispensed together through the dip tube. One configuration is shown in commonly assigned U.S. Pat. No. 6,039,222. This embodiment may utilize a dip tube. The dip tube takes the product and propellant mixture from the bottom of the outer container. Or a piston may be used to expel product, if it is particularly viscous, as described in commonly assigned US publication 2016/0368633.

But aerosol dispensers have typically been used to dispense products which can be used independent of the product temperature. For example, aerosol dispensers are commonly used to dispense cleaning products, insecticide, air fresheners, shaving cream, etc. These products are ubiquitously dispensed at the temperature ambient to the aerosol dispenser, typically room temperature.

But room temperature may not be optimum for all products. Some products may be more optimally used in a warmed or heated condition, the terms being used interchangeably. For example, certain foods are more palatable when served warm. Air freshener may disperse better when warmed. Shaving cream may be perceived to be more comfortable when warmed. Commonly assigned applications, P&G Case 14735, application Ser. No. 15/444,354 and P&G Case 14736, Ser. No. 15/444,356 disclose heating of aerosol dispensers in a microwave oven.

Over pressurization, and rupture may occur, for example, during microwave heating if a microwavable aerosol is left unattended or during manufacture if excessive propellant charge occurs. U.S. Pat. No. 9,394,098 teaches an adapter collar which can purportedly function as a safety shield in the event of overpressurization and rupture. But this attempt adds complexity and additional leakage pathways. And this adapter collar may be ineffective in the case of rupture. U.S. Pat. Nos. 3,074,602; 3,292826; 3,372,827 and 3,815,534 teaches score lines and a pressure relief valve for an aerosol can. But these attempts in the art rely upon precise tolerances and precision manufacture to properly work relieve pressure in the event of over pressurization. Such tolerances may be difficult to maintain in high speed production.

Or bulging of the neck and undesired loss of propellant and/or product may occur in the event of overpressurization. One attempt to overcome this problem is to thicken the entire neck area, above and below the support flange. But this approach is infeasible if it does not allow sufficient room for collets to clinch the valve cup into place. Another approach is found in U.S. Pat. No. 7,303,087. But this approach only moves the problem from below the support flange to above.

Accordingly, it is an object of this invention to provide an aerosol dispenser which minimizes occurrences of rupture in the event of over pressurization, through an advantageous neck geometry.

SUMMARY OF THE INVENTION

In various embodiments, the invention comprises an aerosol dispenser, an outer container for an aerosol dispenser and a preform for an outer container. The aerosol dispenser, outer container and preform each have a neck, which in turn has a crimp ring, to receive a valve cup clinched thereto. Below the crimp ring is a lower neck portion. In all embodiments the crimp ring has a crimp ring axial length, the lower neck portion has a lower neck portion axial length defining an axial ratio therebetween of the crimp ring axial length to the lower neck portion axial length of at least 0.8.

BRIEF DESCRIPTION OF THE DRAWINGS

FIGS. 4A-4B are drawn to scale and taken from FIG. 3, except for the valve cup which is shown schematically.

DETAILED DESCRIPTION OF THE INVENTION

Figure 1:
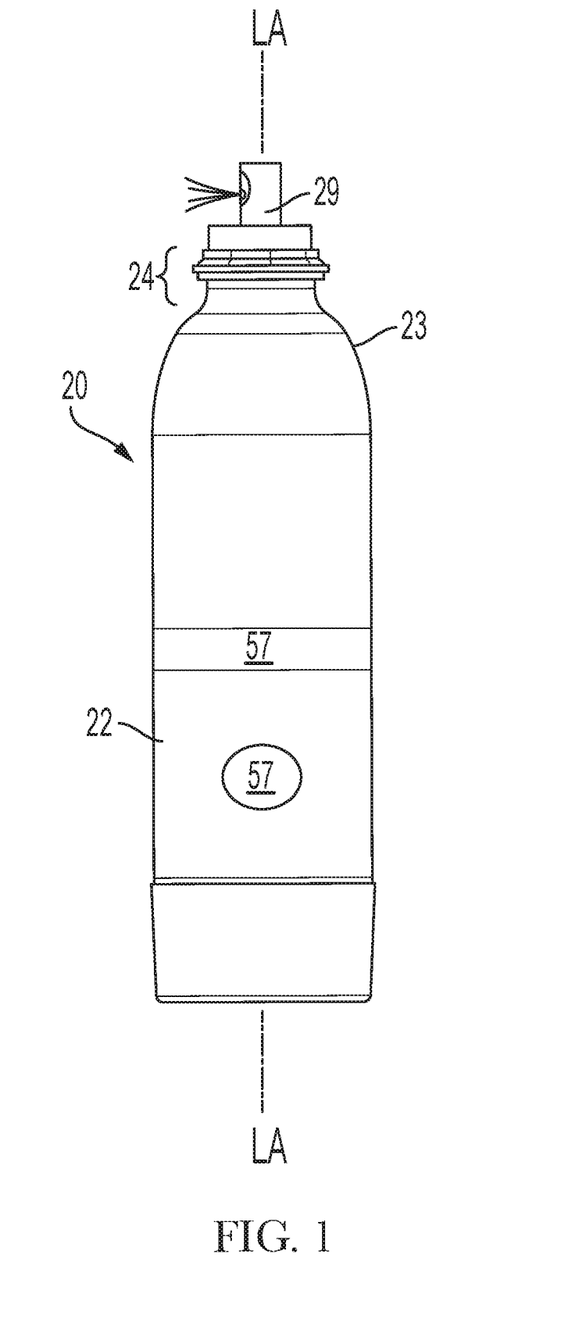
FIG. 1 is a side elevational view of an aerosol dispenser according to the present invention.

Referring to FIG. 1, an aerosol dispenser 20 is shown. The aerosol dispenser 20 comprises a pressurizeable outer container 22 usable for such a dispenser. The outer container 22 may comprise plastic or metal, as are known in the art. The outer container 22 has both product 42 and propellant 40 disposed therein at the point of use.

The outer container 22 may have an opening. The opening is typically at the top of the pressurizeable container 22 when the pressurizeable container 22 is in its-in use position. The opening defines a neck 24, to which other components may be sealed. The neck 24 has a perimeter 24P, which defines the outside of the neck 24. The perimeter 21P of the neck 24 has at least one vent 25, and preferably a plurality of vents 25.

The aerosol dispensers 20, and components thereof, may have a longitudinal axis LA, and may optionally be axisymmetric with a round cross section. Alternatively, the outer container 22, a product delivery device therein, a dispensing valve 28, etc., may be eccentric and have a square, elliptical or other cross section.

The outer container 22 may have an opening. The opening is typically at the top of the pressurizeable container 22 when the pressurizeable container 22 is in its-in use position. The opening defines a neck 24, to which other components may be sealed. The neck 24 has a perimeter 24P, which defines the outside of the neck 24. The perimeter 24P of the neck 24 has at least one vent 25, and preferably a plurality of vents 25.

The top of the neck 24 may have a crimp ring 24CR thereon. The crimp ring 24CR extends radially outwardly from the neck 24 below. A metal valve cup 26 may be clinched to the crimp ring 24CR in known fashion. A gasket 24G may be disposed between the top of the crimp ring 24CR and the valve cup 26.

The valve cup 26 may be integral and formed from a single piece of metal comprising plural contiguous and annular walls. Alternatively, the valve cup 26 may comprise plastic, or any material suitable for forming around or welding to the crimp ring 24CR. Each wall of the valve cup 26 has opposed inner and outer surfaces, the inner surfaces generally facing downward or towards the longitudinal axis LA.

Figure 3:
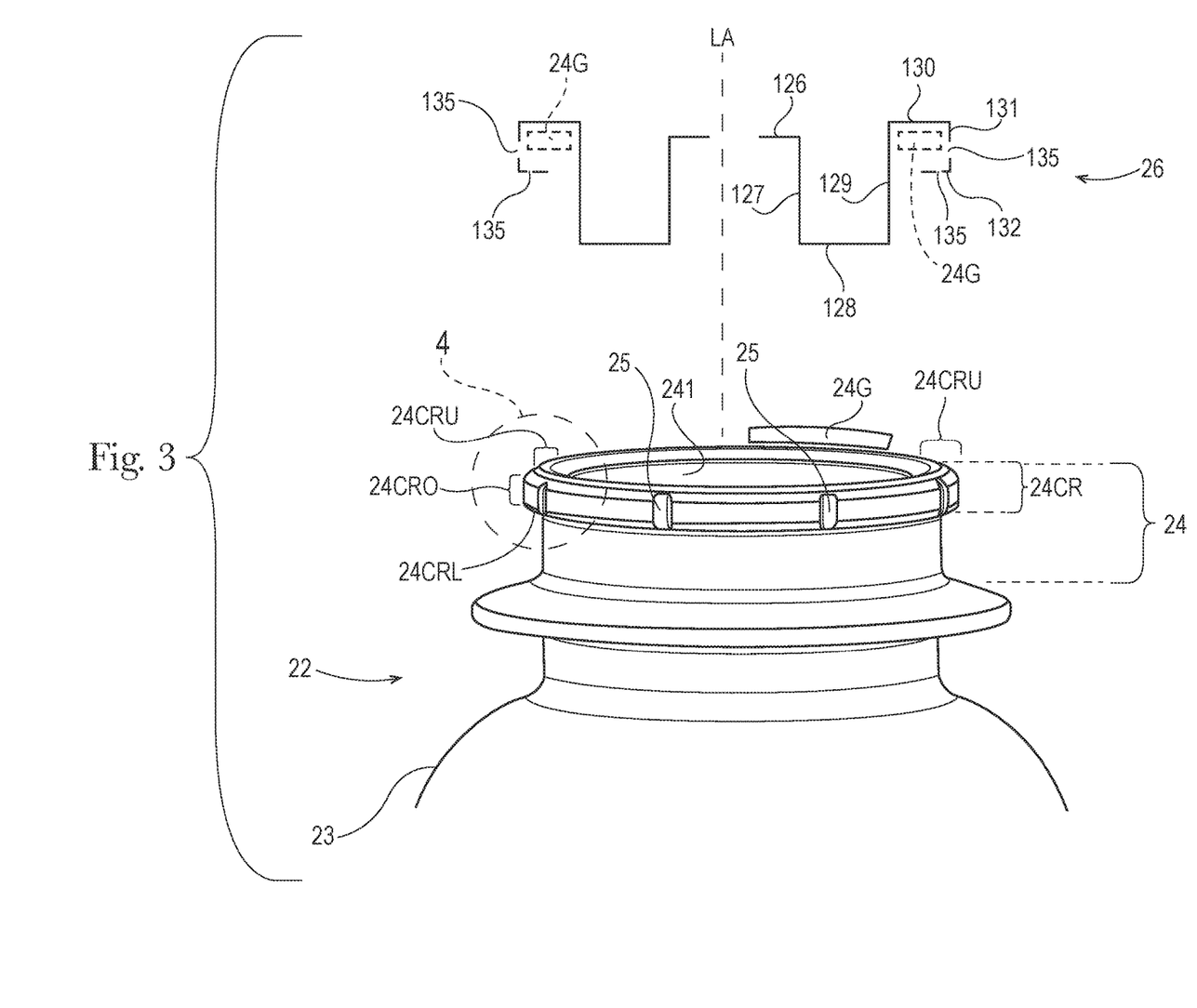
FIG. 3 is a fragmentary perspective view of an outer container for the aerosol dispenser of the claimed invention having an axial length ratio of 1 and a fragmentary exploded gasket and an exploded sectional valve cup, the gasket being shown in phantom in position in the valve cup.

Referring to FIGS. 1 and 3, the valve cup 26 may have a center hole, to allow for a valve stem the longitudinally move therethrough. Radially outward from and adjacent the hole is an annular platform 126. Adjacent, radially outward from and contiguous the platform 126 is an annular inner skirt wall 127. Adjacent, radially outward from and contiguous the inner skirt wall 127 is an annular bottom wall 128. Adjacent, radially outward from and contiguous the bottom wall 128 is an annular outer skirt wall 129.

Preferably the outer skirt wall 129 is spaced away from the inside diameter of the neck 24 to allow for ease of assembly. Adjacent, radially outward from and contiguous the outer skirt wall 129 is an annular top wall 130. The inner surface of the top wall 130 seals against the gasket 24G. Adjacent, radially outward from and contiguous the top wall 130 is an annular outer wall 131. The inner surface of the outer wall 131 seals against the outer surface 24CRO of the crimp ring 24CR. Adjacent, radially outward from and contiguous the outer wall 129 is an annular bottom wall 132. The bottom wall 132 engages the lower surface 24CRL of the crimp ring 24CR to clamp the valve cup 26 in place. The walls 126, 127, 128, 129, 130, 131, 132 are shown in concentric, parallel and orthogonal relationships, although the invention is not so limited. Any suitable angular relationship may be used.

The annular outer wall 131 may be perforate. By perforate it is meant that the outer wall 131 is gas permeable. Gas permeability is attained by one or more circumferentially spaced holes 135 through the outer wall 131. The holes 135 allow for exhausting of propellant 40 and/or product 42 therethrough which escapes past the gasket 24G to ambient.

The holes 135 may be longitudinally centered, or intercept the bottom wall 132. The holes 135 may be equally or unequally sized, equally or unequally circumferentially spaced, and equally or unequally longitudinally disposed. For the system described herein, three to 15 spaced holes 135, having a diameter of 0.3 mm to 1 mm are believed to be suitable and particularly four holes equally spaced at 90 degrees and having a diameter of 0.8 mm is believed suitable.

Recycling class 1 thermoplastic elastomer [TPE] may be selected for the gasket 24G. The TPE material may be selected to be resistant to the propellant 40 and/or product 42 desired for use. A hydrophilic TPE-E based compound formulated to provide adhesion to PET and chemical resistance to silicone oil may be used as one or more components in the aerosol dispenser 20. Class 1 TPE material sold by Kraiburg TPE GmbH & Co KG of Waldkraiburg, Germany under the name Hcc8791-52 may be suitable.

A dispensing valve 28, in turn, may be disposed within the valve cup 26. The dispensing valve 28 provides for retention of product 42 within the aerosol dispenser 20 until the product 42 is selectively dispensed by a user. The product 42 may be dispensed through a dip tube 56 or from a bag 55, as is known in the art.

The dispensing valve 28 may be selectively actuated by an actuator 29. A suitable subcombination may comprise the outer container 22, valve cup 26, dispensing valve 28, and any propellant 40 therein. The outer container 22, and valve 28 according to the present invention may be entirely polymeric and particularly entirely Stream 1 as defined by the Society of Plastics Engineers.

Selective actuation of the dispensing valve 28 allows the user to dispense a desired quantity of the product 42 on demand. Illustrative and nonlimiting products 42 for use with the present invention may include shave cream, shave foam, body sprays, body washes, perfumes, cleansers, air fresheners, astringents, foods, paints, etc.

Figure 2A:
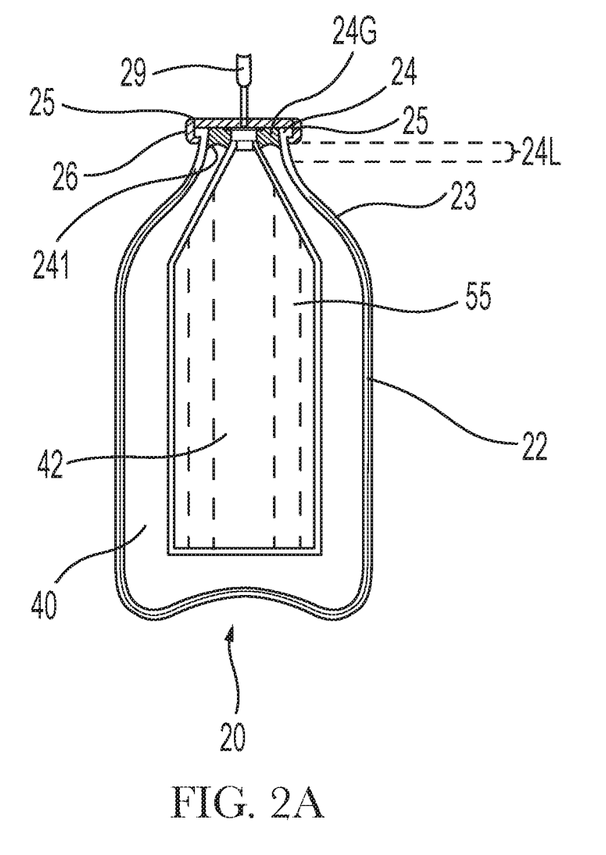
FIG. 2A is a side elevational sectional view of an aerosol dispenser having a collapsible bag.
Figure 2B:
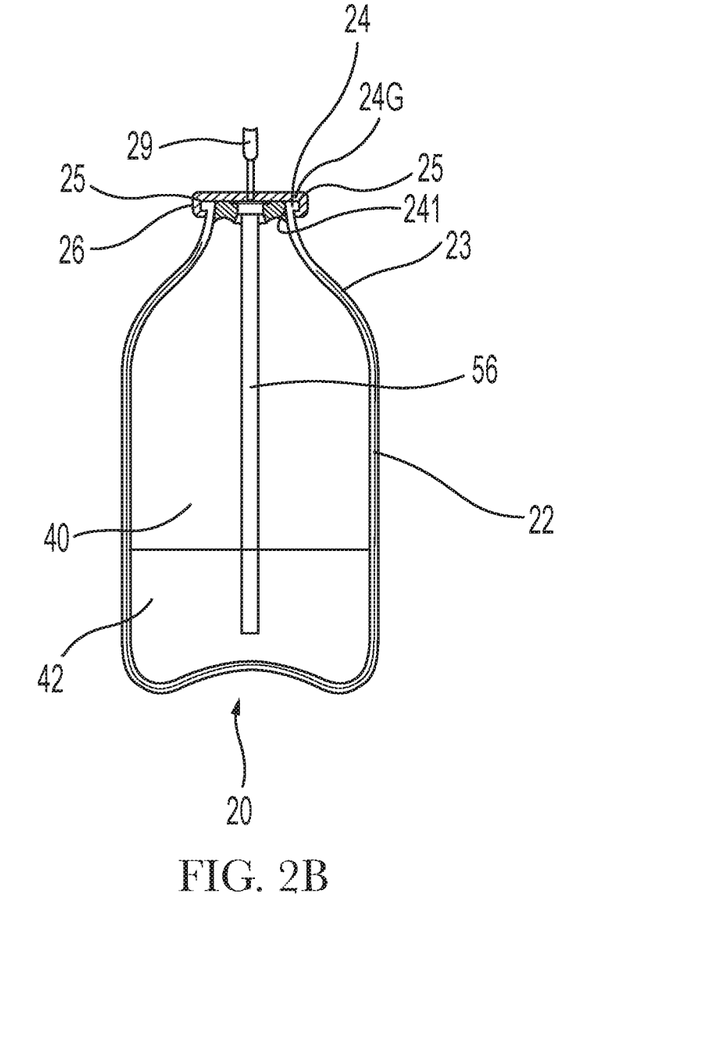
FIG. 2B is a side elevational sectional view an aerosol dispenser having a dip tube.

Referring to FIGS. 2A and 2B, inside the outer container 22 may be a product delivery device. The product delivery device may comprise a collapsible bag 55 as shown in FIG. 2A. The collapsible bag 55 may be mounted in sealing relationship to the neck 24 of the container and/or to the dispensing valve 28. This arrangement is known in the art as a bag-on-valve. The collapsible bag 55 may hold product 42 therein, and prevent intermixing of such product 42 with propellant 40. The propellant 40 may be stored outside the collapsible bag 55, and inside the outer container 22.

The collapsible bag 55 may expand upon being charged with product 42. Such expansion decreases the available volume inside the outer container 22. Decreasing the available volume increases the pressure of any propellant 40 therein according to Boyles law.

The product delivery device may alternatively or additionally comprise a dip tube 56 as shown in FIG. 2B. The dip tube 56 extends from a proximal end sealed to the dispensing valve 28. The dip tube 56 may terminate at a distal end juxtaposed with the bottom of the outer container 22. This embodiment provides for intermixing of the product 42 and propellant 40. Both are co-dispensed in response to selective actuation of the dispensing valve 28 by a user. Again, insertion of product 42 and/or propellant 40 into the outer container 22 increases pressure therein according to Boyles law.

The outer container 22 may comprise a plastic pressurizeable container. The plastic may be polymeric, and particularly comprise PET. The dispensing valve 28, and optional valve cup 26 may be welded to the neck 24 of the outer container 22, as discussed below. The valve cup 26 may be clinched to the neck 24 in known fashion.

Any number of known valve assemblies 28 may be usable with the present invention. One suitable and non-limiting example, is shown. A suitable dispensing valve 28 may be made according to the teachings of commonly assigned publications 2010/0133301A1 and/or 2010/0133295A1, and forms no part of the claimed invention.

The pressurizeable container may further include a propellant 40. The propellant 40 may be disposed between the outer container 22 and the product delivery device. Alternatively propellant 40 may be disposed in the outer container 22 and/or the collapsible bag 55. Typically the pressure in the outer container 22 is greater than the pressure in the collapsible bag 55, so that product 42 may be dispensed from within the bag. If a dip tube 56 is selected for the product delivery device, the propellant 40 and product 42 may be intermixed, and thus co-dispensed. The pressure of the propellant 40 within the outer container 22 provides for dispensing of the product 42/co-dispensing of product 42/propellant 40 to ambient, and optionally to a target surface. The target surface may include a surface to be cleaned or otherwise treated by the product 42, skin, etc. Such dispensing occurs in response to the user actuating the dispensing valve 28.

Examining the components in more detail, the product delivery device may comprise a flexible, collapsible bag 55. The pressure boundary for the propellant 40 is formed, in part, by the collapsible bag 55. Or the product delivery device may comprise a dip tube 56. In either embodiment, the pressure boundary for the propellant 40 is formed, in part by the underside of the dispensing valve 28 when the valve 28 is closed.

If desired, the outer container 22, dispensing valve 28, dip tube 56 and/or collapsible bag 55 may be polymeric. By polymeric it is meant that the component is formed of a material which is plastic, comprises polymers, and/or particularly polyolefin, polyester or nylons. Thus, the entire aerosol dispenser 20 or, specific components thereof, may be free of metal, allowing exposure to microwave energy.

The valve cup 26 may comprise ductile and formable metal such as low carbon steel or aluminum. The valve cup 26 may be stamped and clinched in known fashion.

If desired, the outer container 22, collapsible bag 55, and/or dip tube 56, may be transparent or substantially transparent. If both the outer container 22 and a collapsible bag 55 used as the product delivery device are transparent, this arrangement provides the benefit that the consumer knows when product 42 is nearing depletion and allows improved communication of product 42 attributes, such as color, viscosity, etc. Also, labeling or other decoration 57 of the container 22 may be more apparent if the background to which such decoration is applied is clear.

Alternatively or additionally, the outer container 22, collapsible bag 55, etc. may be transparent and colored with like or different colors.

The outer container 22 may define a longitudinal axis LA of the aerosol dispenser 20. The outer container 22 may be axisymmetric as shown, or, may be eccentric. While a round cross-section is shown, the invention is not so limited. The cross-section may be square, elliptical, irregular, etc. Furthermore, the cross section may be generally constant as shown, or may be variable. If a variable cross-section is selected, the outer container 22 may be barrel shaped, hourglass shaped, or monotonically tapered.

The outer container 22 may range from 6 to 40 cm in height, taken in the axial direction and from 4 to 60 cm in diameter if a round footprint is selected. The outer container 22 may have a volume ranging from 50 or 115 cc to 1000 cc exclusive of any components therein, such as a product delivery device. The outer container 22 may be injection stretch blow molded. If so, the injection stretch blow molding process may provide a stretch ratio of greater than 8, 8.5, 9, 9.5, 10, 12, 15 or 20.

The outer container 22 may sit on a base. The base is disposed on the bottom of the outer container 22 and of the aerosol dispenser 20. Suitable bases include petaloid bases, champagne bases, hemispherical or other convex bases used in conjunction with a base cup. Or the outer container 22 may have a flat base with an optional punt.

A punt is a concavity in the bottom of the container and extending towards the neck 24 of the container. A punt is distinguishable from a general concavity in the bottom of a container, as a punt has a smaller diameter than is defined by the footprint of the bottom of the container. The punt may be axisymmetric about the longitudinal axis LA. The vertex of the punt may be coincident the longitudinal axis LA. The outer container 22 sidewall also defines a diameter.

The plastic outer container 22 preferably does not creep under pressures ranging from 100 to 970 kPa, and having a sidewall thickness less than 0.5 mm. The outer container 22 may be pressurized to an internal gage pressure of 100 to 970, 110 to 490 or 270 to 420 kPa. A particular aerosol dispenser 20 may have an initial propellant 40 pressure of 1100 kPA and a final propellant 40 pressure of 120 kPa, an initial propellant 40 pressure of 900 kPA and a final propellant 40 pressure of 300 kPa, an initial propellant 40 pressure of 500 kPA and a final propellant 40 pressure of 0 kPa, etc. The propellant 40 pressurizes the product 42 to a pressure greater than ambient, to provide for delivery from the aerosol dispenser 20.

The aerosol dispenser 20, as presented to a user may have an initial pressure. The initial pressure is the highest pressure encountered for a particular filling operation, and corresponds to no product 42 yet being dispensed from the product delivery device. As product 42 is depleted, the outer container 22 approaches a final pressure. The final pressure corresponds to depletion of substantially all product 42, except for small residual, from the product delivery device.

The outer container 22, and all other components, except the TPE gasket 24G, and valve cup 26 may comprise, consist essentially of or consist of PET, PEN, Nylon EVOH or blends thereof to meet DOT SP 14223. Such materials may be selected from a single class of recyclable materials, as set forth above by the SPI.

The neck 24 may be connected to the container sidewall by a shoulder 23. The shoulder 23 may more particularly be joined to the sidewall by a radius. The shoulder 23 may have an annular flat. The neck 24 may have a greater thickness at the top of the outer container 22 than at lower portions of the neck 24 to provide a differential thickness. Such differential thickness may be accomplished through having an internally stepped neck 24 thickness.

The product 42 may also be inflammable. Flammability, and the absence thereof, may be determined in accordance with the absence of a fire point per ASTM D 92, Standard Test Method for Flash and Fire Points by Cleveland Open Cup Tester.

The propellant 40 may comprise nitrogen, air and mixtures thereof. Propellant 40 listed in the US Federal Register 49 CFR 1.73.115, Class 2, Division 2.2 are also considered acceptable. The propellant 40 may particularly comprise a hydrofluoroolefin, a Trans-1,3,3,3-tetrafluoroprop-1-ene, and optionally a CAS number 1645-83-6 gas. One such propellant 40 is commercially available from Honeywell International of Morristown, N.J. under the trade name HFO-1234ze or GWP-6.

If desired, the propellant 40 may be condensable. By condensable, it is meant that the propellant 40 transforms from a gaseous state of matter to a liquid state of matter within the outer container 22 and under the pressures encountered in use. Generally, the highest pressure occurs after the aerosol dispenser 20 is charged with product 42 but before that first dispensing of that product 42 by the user. A condensable propellant 40 provides the benefit of a flatter depressurization curve as product 42 is depleted during usage.

A condensable propellant 40 provides the benefit that a greater volume of gas may be placed into the container at a given pressure. Upon dispensing of a sufficient volume of product 42 from the space between the outer container 22 and the product delivery device, the condensable propellant 40 may flash back to a gaseous state of matter.

The pressurizeable container 22 may be charged with an amount of product 42 which brings the pressure, as initially presented to the user, sufficient to dispense and substantially deplete the product 42 from the aerosol dispenser 20. The final pressure, after substantially all product 42 is depleted, is less than the initial pressure.

Product 42 may be charged into the container through the dispensing valve 28, as is known in the art. When product 42 is charged into the container, the product 42 increases the pressure of the propellant 40. The increase in propellant 40 pressure occurs due to the increase in volume of the collapsible bag 55 if such a bag 55 is used as a product delivery device. Likewise, the increase in propellant 40 pressure occurs due to the increase in the number of moles of product 42 in the outer container 22 if a dip tube 56 is selected. An aerosol dispenser 20 may be made according to commonly assigned US 2012/0292338A1; US 2012/0291911A1; and/or US 2012/0291912A1.

The pressure of the propellant 40 at the end of the first phase of manufacture may correspond to the pressure at the end of the usable life of the aerosol dispenser 20, herein referred to as the final pressure. The pressure of the propellant 40 at the end of the second phase of manufacture may correspond to the pressure as initially presented to the user.

The propellant 40 may be provided at a pressure corresponding to the final pressure of the aerosol dispenser 20 when substantially all product 42 is depleted therefrom. The propellant 40 may be charged to a pressure of less than or equal to 300, 250, 225, 210, 200, 175 or 150 kPa. The propellant 40 may be charged to a pressure greater than or equal to 50, 75, 100 or 125 kPa. The gage pressures cited herein are to be construed as the initial pressure inside the outer container 22, as manufactured and prior to first use.

Plural valves 28 may be used with a single outer container 22. This arrangement provides the benefit that product 42 and propellant 40, or disparate products 42, are mixed at the point of use, allowing synergistic results between incompatible materials. This arrangement also provides the benefit that delivery of the propellant 40 provides motive force to the product 42, often resulting in smaller particle size distributions. Smaller particle size distributions can be advantageous for uniform product 42 distribution and minimizing undue wetting.

The aerosol dispenser 20, and particularly the outer container 22 thereof, may have a burst pressure of at least 1100 kPa at 54.4 degrees C. and further may have a burst pressure of at least 1650 kPa at 20 degrees C. Meeting these burst pressures is believed to avoid the need for using DOT exemptions.

Referring to FIG. 3, the outer container 22 has a crimp ring 24CR which sits on a lower neck portion 24L. The lower neck portion 24L may be directly subjacent the crimp ring 24CR. The crimp ring 24CR and lower neck portion 24L are distinguished by a change in thickness as taken in the radial direction. The crimp ring 24CR is preferably at least 1, 2, 3, 4, 5 or 6 mm, but not more than 12 mm thicker in radius than the lower neck portion 24L to allow for proper clinching of the valve 26 in place.

The round crimp ring 24CR has an inner diameter oriented towards the longitudinal centerline LA and an outer diameter opposed thereto. The crimp ring 24CR have be thought of as having three conjoined surfaces, an upper surface 24CRU, a lower surface 24CRL opposed thereto, and an outer surface 24CRO joining the upper surface 24CRU and lower surface 24CRL. The three surfaces 24CRU, 24CRL and 24CRO are shown in parallel and orthogonal relationships, although the invention is not so limited. Any suitable angular relationship may be used.

The upper surface 24CRU of the crimp ring 24CR typically has two annular beads 242 to minimize leakage through the gasket 24G. The annular beads 242 are optional and form no part of the claimed invention. The upper surface 24CRU preferably does not form part of the claimed invention.

Figure 4A:
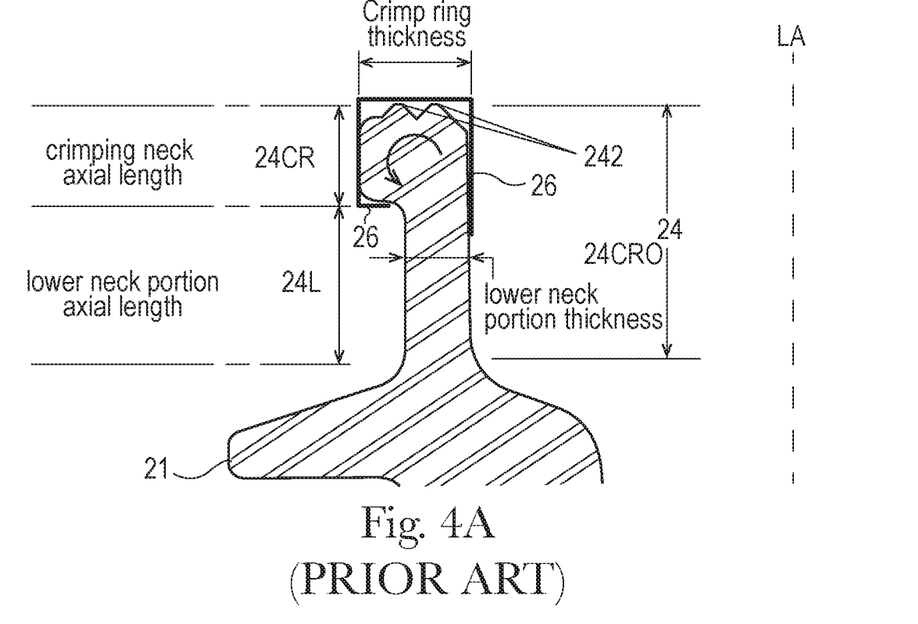
FIG. 4A is a fragmentary enlarged view of a crimp ring according to an aerosol marketed by the instant assignee.

Referring to FIG. 4A, an outer container 22, and thus an aerosol container 20, according to the prior art has a crimp ring 24CR with an outer diameter of 31.5 mm an inner diameter of 25.4 mm and a radial thickness of 6.1 mm. The lower neck portion 24L has an outer diameter of 29.0 mm an inner diameter of 25.4 mm and a thickness of 3.6 mm. As used herein the thickness ratio is the ratio of the radius of the crimp ring 24CR to the radius of the lower neck portion 24L. The radial thicknesses are measured at the axial midpoints of the crimp ring 24CR and lower neck portion 24L.

Previous attempts in the art sought to increase the thickness in the radial direction and optimize the radial thickness ratios, as set forth in the aforementioned U.S. Pat. No. 7,303,087. But this attempt only considers thickness of the neck 24 above and below the support flange 21. This approach does not consider the effect of the crimp ring 24CR on the stability of the aerosol dispenser 20 under pressure.

The outer container 22 of FIG. 4A has a crimp ring 24CR with an axial dimension of 2.9 mm and a lower neck portion 24L with an axial dimension of 5.2 mm for a total length under consideration of 8.1 mm and an axial ratio of 0.56 (5.2/8.1=0.56).

As used herein the axial ratio is the ratio of the axial length of the crimp ring 24CR to the axial length of the lower neck portion 24L. The axial length of the crimp ring 24CR is measured parallel to the longitudinal axis from the highest point on the crimp ring 24CR, including any beads 242 thereon, to the bottom of the crimp ring 24CR at the outer edge thereof. The axial length of the lower neck portion 24L is measured from the bottom of the crimp ring 24CR at the outer edge thereof to the start of the tangent at the top of the support flange 21. If a support flange 21 is not used, the axial length of the lower neck portion is measured from the bottom of the crimp ring 24CR at the outer edge thereof to the start of the tangent at the top of the shoulder 23. Again, the prior art has not addressed the axial ratio, which applicant has unexpectedly found to be a useful factor in construction of the outer container 22.

Figure 4B:
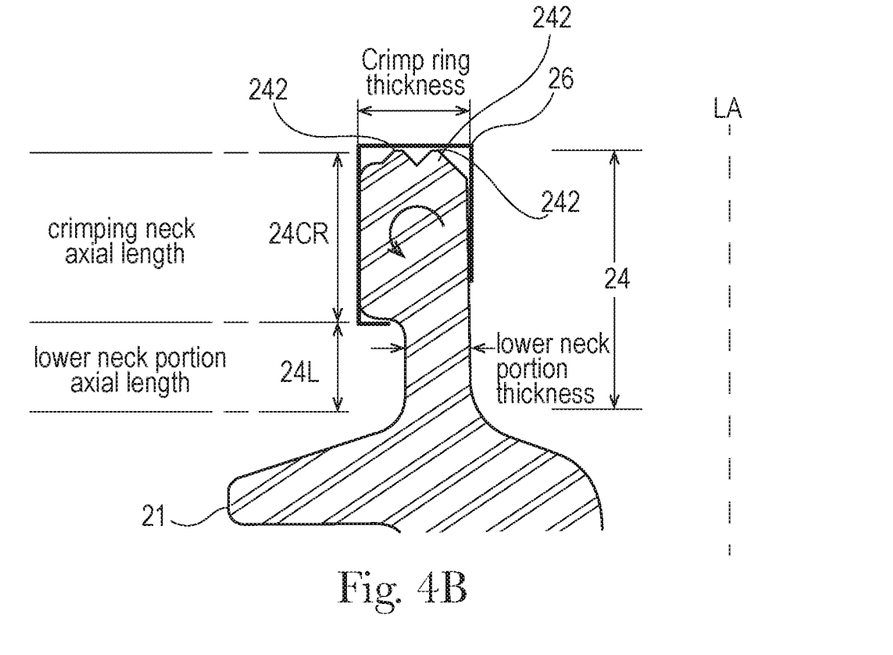
FIG. 4B is a fragmentary enlarged view of a crimp ring according to the present invention.

Referring to FIG. 4B, the aerosol dispenser 20, outer container 22 and preform 60 according to the present invention may have a thickness ratio of at least 1.4, 1.6, 1.8, 2, 2.5 or 3, but preferably not more than 6, 7 or 8, and the aforementioned diameters. The embodiment of FIG. 4B has a thickness ratio of 1.7.

And in the embodiment of FIG. 4B the crimp ring 24CR has an axial length of 5.5 mm and the lower neck portion has an axial length of 2.5 mm for a total length under consideration of 8 mm. This embodiment has an axial ratio of 2.2 (5.5/2.5=2.2).

Applicant has unexpectedly found that for the common neck lengths of 5 to 12 mm and more common neck lengths of 6 to 10 mm, an axial ratio of at least 1 has been found to be suitable. The axial ratio may range from at least 0.8, 1 1.2, 1.4, 1.6 1.8, 2, 2.5, 3, or 4 to 5.

The embodiment of FIG. 4B has a crimp ring 24CR with a crimp ring thickness of 3.05 mm and a lower neck portion 24L with a lower neck portion thickness 1.78 mm. This geometry provides the crimp ring 24CR with a radial overhang of 1.27 mm (3.05 mm-1.78 mm=1.27 mm) relative to the lower neck portion 24L. This geometry also provides a thickness ratio of 1.71 (3.05 mm/1.78 mm=1.71).

The axial ratio should not be so great as to leave too little axial length of the lower neck portion 24L. If the lower neck portion 24L is too small, the collets which radially collapse to clinch the valve cup 26 into place will have insufficient space. Preferably, the axial length of the lower neck portion 24L is at least 2 mm to allow sufficient space for the collets. More preferably the axial length of the lower neck portion 24L is in the range of 2 mm to 4 mm, more preferably 2.5 to 3 mm to optimize the axial length ratio.

The crimp ring 24CR may be modelled at any cross section thereof as a rectangle having an axial length and a radial thickness. The axial length may be divided by the radial thickness to yield an aspect ratio. The prior art known to applicant has an aspect ratio less than 1, approximately 1 and less than 1.2. Without being bound by theory, it is believed that that the square, or nearly square, aspect ratio of the prior art allows undesired rotation of the crimp ring 24CR within the valve cup 26. Such undesired rotation may allow unintended leakage of propellant 40 and/or product 42.

Applicant has unexpectedly found a basis to believe that an aspect ratio greater than 1.4, 1.6, 1.8, 2 and 2.5 but less than 5 will prophetically prevent or even minimize undue rotation of the crimp ring 24CR within the valve cup 26. Conversely, a square aspect ratio within a square valve cup is prophetically believed to allow rotation, and potential leakage, to occur.

The embodiment of FIG. 4B has a crimp ring 24CR with an axial length of 5.5 mm and a radial thickness of 3 mm. This geometry provides an aspect ratio of 1.8 (5.5 mm/3 mm=1.8). The lower neck portion 24L of FIG. 4B has an axial length of 2.5 mm to provide sufficient clearance for the collets to clinch the valve cup 26 into position. The axial length of the entire neck 24 is 8 mm (5.5 mm+2.5 mm=8 mm), well within the common dimensions for typical aerosol dispensers 20.

Referring to FIGS. 4A-4B, the outer surface 24CRO of the crimp ring 24CR may have at least one vent 25. The vent 25 comprises a channel through the outer surface 24CRO and between the outer surface 24CRO and the valve cup 26. The vent 25 is integral with the neck 24, so that subsequent steps are not needed to make the vents operational and useful.

For any of the aforementioned surfaces, i.e. the inner diameter of the neck 24, the upper surface 24CRU of the crimp ring 24CR, and lower surface 24CRL of the crimp ring 24CR, one, two, or preferably at least three equally spaced vents 25 may be used. Six to 12 vents 25 are believed to be suitable. The vents 25 may be of constant cross section or variable cross section. The vents 25 may be of equal or unequal size, geometry and flow area. The vents 25 may have any suitable cross section and hydraulic radius.

Figure 5:
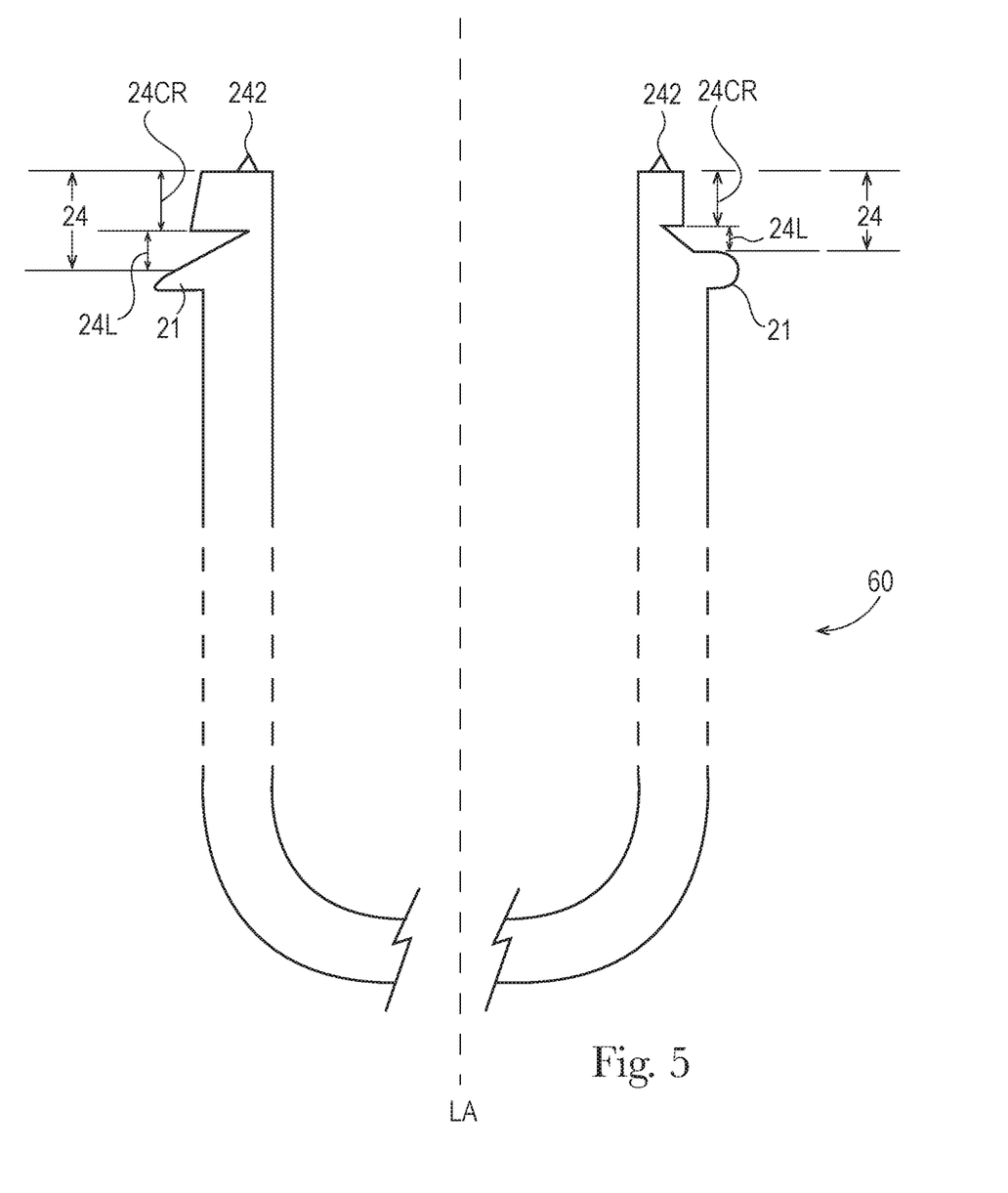
FIG. 5 is a split side view of an indeterminate length preform having a variable thickness lower neck portion for the outer container of the claimed invention, the left side of the preform having a variable thickness crimp ring, the lower neck portion of the left side extending to the upper tangent of the crimp ring.

Referring to FIG. 5, any of the aforementioned configurations may be incorporated into the preform 60. The preform 60 having the aforementioned geometry of lower neck portion 24L and crimp ring 24CR is blown into an outer container 22 using known ISBM techniques. This arrangement provides the benefit that the desired geometry is present without additional steps or complexity being required during manufacture. Further no additional steps or cost are required for the geometry to be in service and effective.

In various embodiments, the invention may be described according to the following paragraphs.

A. A preform 60 for use in an outer container 22 of an aerosol dispenser 20 and having a longitudinal axis, said preform 60 comprising:
   an open top having a crimp ring 24CR therearound,
   a support flange 21 disposed in spaced relationship below said crimp ring 24CR,
   a lower neck portion 24L depending from said crimp ring 24CR to said support flange 21,
   sidewalls depending below said support flange 21, and
   a closed end bottom joined to said sidewalls,
   said crimp ring 24CR having a crimp ring 24CR axial length, said lower neck portion 24L having a lower neck portion 24L axial length defining an axial ratio therebetween of said crimp ring 24CR axial length to said lower neck portion 24L axial length of at least 1.

B. A preform 60 according to paragraph A wherein said lower neck portion 24L has an axial length of 2 to 4 mm C. A preform 60 according to paragraph B wherein said lower neck portion 24L has an axial length of 2 to 4 mm and said axial ratio is from 1.2 to 3.

D. A preform 60 according to paragraph C wherein said lower neck portion 24L has an axial length of 2.5 to 3 mm and said axial ratio is from 1.8 to 2.5.

E. A preform 60 according to paragraphs A, B, C and D wherein said lower neck portion 24L has an axial length of 2 to 4 mm, said crimp ring 24CR has a crimp ring 24CR radius, said lower neck portion 24L has a lower neck portion 24L radius defining a thickness ratio therebetween of said crimp ring 24CR radius to said lower neck portion 24L radius, said thickness ratio ranging from 1.4 to 2.5.

F. An outer container 22 for use in an aerosol dispenser 20 and having a longitudinal axis, said outer container 22 comprising:
   an open top having a crimp ring 24CR therearound,
   a shoulder 23 disposed in spaced relationship below said crimp ring 24CR,
   a lower neck portion 24L depending from said crimp ring 24CR to said shoulder 23,
   sidewalls depending below said shoulder 23, and
   a closed end bottom joined to said sidewalls,
   said crimp ring 24CR having a crimp ring 24CR axial length, said lower neck portion 24L having a lower neck portion 24L axial length defining an axial ratio therebetween of said crimp ring 24CR axial length to said lower neck portion 24L axial length of at least 1.

G. An outer container 22 according to paragraph F wherein said lower neck portion 24L has an axial length of 2 to 4 mm H. An outer container 22 according to paragraphs F and G having a volume ranging from 115 to 1000 cc and wherein said lower neck portion 24L has an axial length of 2 to 4 mm and said axial ratio is from 1.2 to 3.

I. An outer container 22 according to paragraph H having a volume ranging from 115 to 1000 cc and wherein said lower neck portion 24L has an axial length of 2.5 to 3 mm and said axial ratio is from 1.8 to 2.5.

J. An outer container 22 according to paragraphs F, G, H and I wherein said lower neck portion 24L has an axial length of 2 to 4 mm, said crimp ring 24CR has a crimp ring 24CR radius, said lower neck portion 24L has a lower neck portion 24L radius defining a thickness ratio therebetween of said crimp ring 24CR radius to said lower neck portion 24L radius, said thickness ratio ranging from 1.4 to 2.5.

K. An outer container 22 according to paragraphs F, G, H, I and J, further comprising a valve cup joined to said crimp ring 24CR, a valve disposed in said valve cup, a product delivery device and propellant disposed in said outer container 22, said outer container 22 being free of product therein.

L. An aerosol dispenser 20 for dispensing a product therefrom and having a longitudinal axis, said aerosol dispenser 20 comprising:
   an outer container 22 having an open top with a crimp ring 24CR therearound,
   a shoulder 23 disposed in spaced relationship below said crimp ring 24CR,
   a lower neck portion 24L depending from said crimp ring 24CR to said shoulder 23,
   sidewalls depending below said shoulder 23,
   a closed end bottom joined to said sidewalls,
   a valve cup joined to said crimp ring 24CR,
   a valve joined to said valve cup for dispensing product from said outer container 22,
   a product delivery device disposed in said outer container 22, and
   propellant disposed in said outer container 22 and in operable relationship with said product delivery device,
   said crimp ring 24CR having a crimp ring 24CR axial length and a crimp ring 24CR thickness, defining an aspect ratio therebetween of said crimp ring 24CR axial length to said crimp ring 24CR thickness of at least 1.6.

M. An aerosol dispenser 20 according to paragraph L wherein said product delivery device comprises a dip tube.

N. An aerosol dispenser 20 according to paragraphs L and M wherein said lower neck portion 24L has an axial length of 2 to 4 mm O. An aerosol dispenser 20 according to paragraphs L, M and N having a volume ranging from 115 to 1000 cc and wherein said lower neck portion 24L has an axial length of 2 to 4 mm and said aspect ratio is from 1.8 to 5.

P. An aerosol dispenser 20 according to paragraph O having a volume ranging from 115 to 1000 cc and wherein said lower neck portion 24L has an axial length of 2.5 to 3 mm Q. An aerosol dispenser 20 according to paragraphs L, M, N, O and P wherein said lower neck portion 24L has an axial length of 2 to 4 mm, said crimp ring 24CR has a crimp ring 24CR radius, said lower neck portion 24L has a lower neck portion 24L radius defining a thickness ratio therebetween of said crimp ring 24CR radius to said lower neck portion 24L radius, said thickness ratio ranging from 1.4 to 2.5.

R. An aerosol dispenser 20 according to paragraphs L, M, N, O, P and Q further comprising a gasket 24G intermediate said valve cup and said crimp ring 24CR.

S. An aerosol dispenser 20 according to paragraphs L, M, N, O, P, Q and R wherein said crimp ring 24CR has an outer radius of 25 to 35 mm T. An aerosol dispenser 20 according to paragraphs L, M, N, O, P, Q, R and S wherein said crimp ring 24CR has an inside diameter of 25.4 mm.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" and a pressure disclosed as "about 1100 kPa" is intended to include 1103.2 kPa.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern. All limits shown herein as defining a range may be used with any other limit defining a range. That is the upper limit of one range may be used with the lower limit of another range, and vice versa.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An outer container for use in an aerosol dispenser and having a longitudinal axis, said outer container comprising:
    an open top having a crimp ring therearound,
    a shoulder disposed in spaced relationship below said crimp ring,
    a lower neck portion depending from said crimp ring to said shoulder,
    sidewalls depending below said shoulder, and
    a closed end bottom joined to said sidewalls,
    said crimp ring having a crimp ring axial length, said lower neck portion having a lower neck portion axial length defining an axial ratio therebetween of said crimp ring axial length to said lower neck portion axial length, wherein said lower neck portion has an axial length of 2 to 4 mm and said axial ratio is from 1.2 to 3.

2. An outer container according to claim 1 having a volume ranging from 115 to 1000 cc.

3. An outer container according to claim 1 having a volume ranging from 115 to 1000 cc and wherein said lower neck portion has an axial length of 2.5 to 3 mm and said axial ratio is from 1.8 to 2.5.

4. An outer container according to claim 1 wherein said crimp ring has a crimp ring radius, said lower neck portion has a lower neck portion radius defining a thickness ratio therebetween of said crimp ring radius to said lower neck portion radius, said thickness ratio ranging from 1.4 to 2.5.

5. An outer container according to claim 1, further comprising a valve cup joined to said crimp ring, a valve disposed in said valve cup, a product delivery device and propellant disposed in said outer container, said outer container being free of product therein.

* * * * *